United States Patent [19]

Matheny et al.

[11] Patent Number: 5,548,544
[45] Date of Patent: Aug. 20, 1996

[54] METHOD AND APPARATUS FOR ROUNDING THE RESULT OF AN ARITHMETIC OPERATION

[75] Inventors: David T. Matheny; Paul K. Miller; Michael P. Taborn, all of Austin, Tex.

[73] Assignee: IBM Corporation, Armonk, N.Y.

[21] Appl. No.: 323,484

[22] Filed: Oct. 14, 1994

[51] Int. Cl.[6] ............................................. G06F 7/38
[52] U.S. Cl. ................................ 364/745; 364/748
[58] Field of Search ................................ 364/745, 748

[56] References Cited

U.S. PATENT DOCUMENTS

| | | | |
|---|---|---|---|
| Re. 33,629 | 7/1991 | Palmer et al. | 364/748 |
| 4,338,675 | 7/1982 | Palmer et al. | 364/748 |
| 4,484,259 | 11/1984 | Palmer et al. | 364/754 |
| 4,562,553 | 12/1985 | Mattedi et al. | 364/745 |
| 4,839,846 | 6/1989 | Hirose et al. | 364/748 |
| 4,893,268 | 1/1990 | Denman, Jr. et al. | 364/759 |
| 4,926,370 | 5/1990 | Brown et al. | 364/748 |
| 4,941,120 | 7/1990 | Brown et al. | 364/748 |
| 4,979,142 | 12/1990 | Allen et al. | 364/767 |
| 5,128,889 | 7/1992 | Nakamo | 364/748 |

*Primary Examiner*—Tan V. Mai
*Attorney, Agent, or Firm*—Donald R. Comuzzi; Christopher L. Makay; James E. Ruland

[57] ABSTRACT

An apparatus for rounding an answer produced during the execution of an operation by a multiple stage execution pipeline includes first circuitry for detecting when the operation is iterative and accuracy bits associated with the answer to determine if a rounding calculation is required. When the first circuitry detects a rounding calculation is required, it sets a correction factor for the answer in accordance with a rounding mode and the detected accuracy. In a method practiced by the apparatus, the rounding an answer produced during the execution of an operation occurs through the steps of detecting, when the operation is iterative, accuracy bits associated with the answer to determine if a rounding calculation is required, and, when the rounding calculation is required, setting a correction factor for the answer in accordance with a rounding mode and the detected accuracy bits.

11 Claims, 3 Drawing Sheets

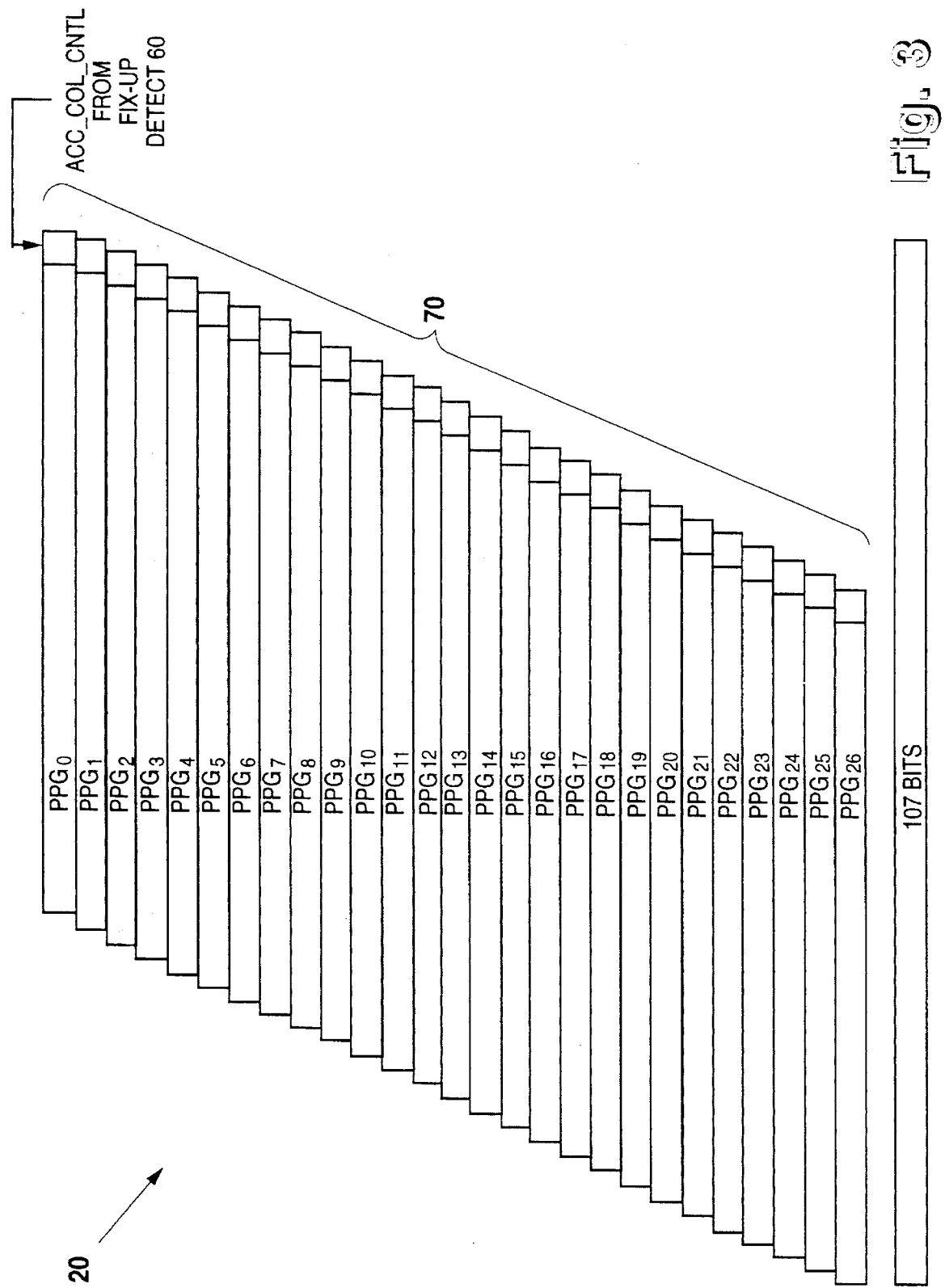

METHOD AND APPARATUS FOR ROUNDING THE RESULT OF AN ARITHMETIC OPERATION

BACKGROUND OF THE INVENTION

1. Field of the Invention

The present invention relates to floating point units and, more particularly, but not by way of limitation, to a method and apparatus for rounding the result of an arithmetic operation.

2. Description of the Related Art

In order to produce answers that conform with the IEEE/ANSI 754-1985 standard for Floating Point Arithmetic, floating point units must output a mantissa that includes the number of bits required under the standard. Floating point units typically produce more bits than necessary to form the mantissa bits as specified in the IEEE 754-1985 standard and then round according to the additional bits. Traditionally, for iterative operations such as division or square root, the floating point unit produces twice as many bits as required for an IEEE standard mantissa. However, producing twice as many bits significantly decreases the operating speed of the floating point unit because that requires an increased number of clock cycles.

In an attempt to reduce the number of clock cycles required to perform iterative operations, floating point units include a circuit that examines a number of additional bits to determine if the mantissa forms the correct answer. If it is determined that the mantissa does not form the correct answer, incrementing of the mantissa might be necessary. When the mantissa does not form the correct answer, a series of operations are launched through the floating point unit that determine if the mantissa bits must be incremented. Unfortunately, these operations are not independent in that later operations require answers from prior operations before they can execute. Consequently, when the additional operations are necessary, the number of clock cycles required to determine the final mantissa can increase to an unacceptable level.

Accordingly, circuitry that decreases the number of clock cycles required to round results of iterative arithmetic operations will improve the performance of floating point units.

SUMMARY OF THE INVENTION

An apparatus for rounding an answer produced during the execution of an operation by a multiple stage execution pipeline includes circuitry for detecting when the operation is iterative and accuracy bits associated with the answer to determine if a rounding calculation is required. When the circuitry detects a rounding calculation is required, it sets a correction factor for the answer in accordance with a rounding mode and the detected accuracy. In a method practiced by the apparatus, the rounding of an answer produced during the execution of an operation occurs through the steps of detecting, when the operation is iterative, accuracy bits associated with the answer to determine if a rounding calculation is required, and, when the rounding calculation is required, setting a correction factor for the answer in accordance with a rounding mode and the detected accuracy bits.

BRIEF DESCRIPTION OF THE DRAWINGS

FIG. 3 is a diagram of a multiply-add array including the correction factor column of the preferred embodiment.

DETAILED DESCRIPTION OF THE PREFERRED EMBODIMENT

Figure 1:
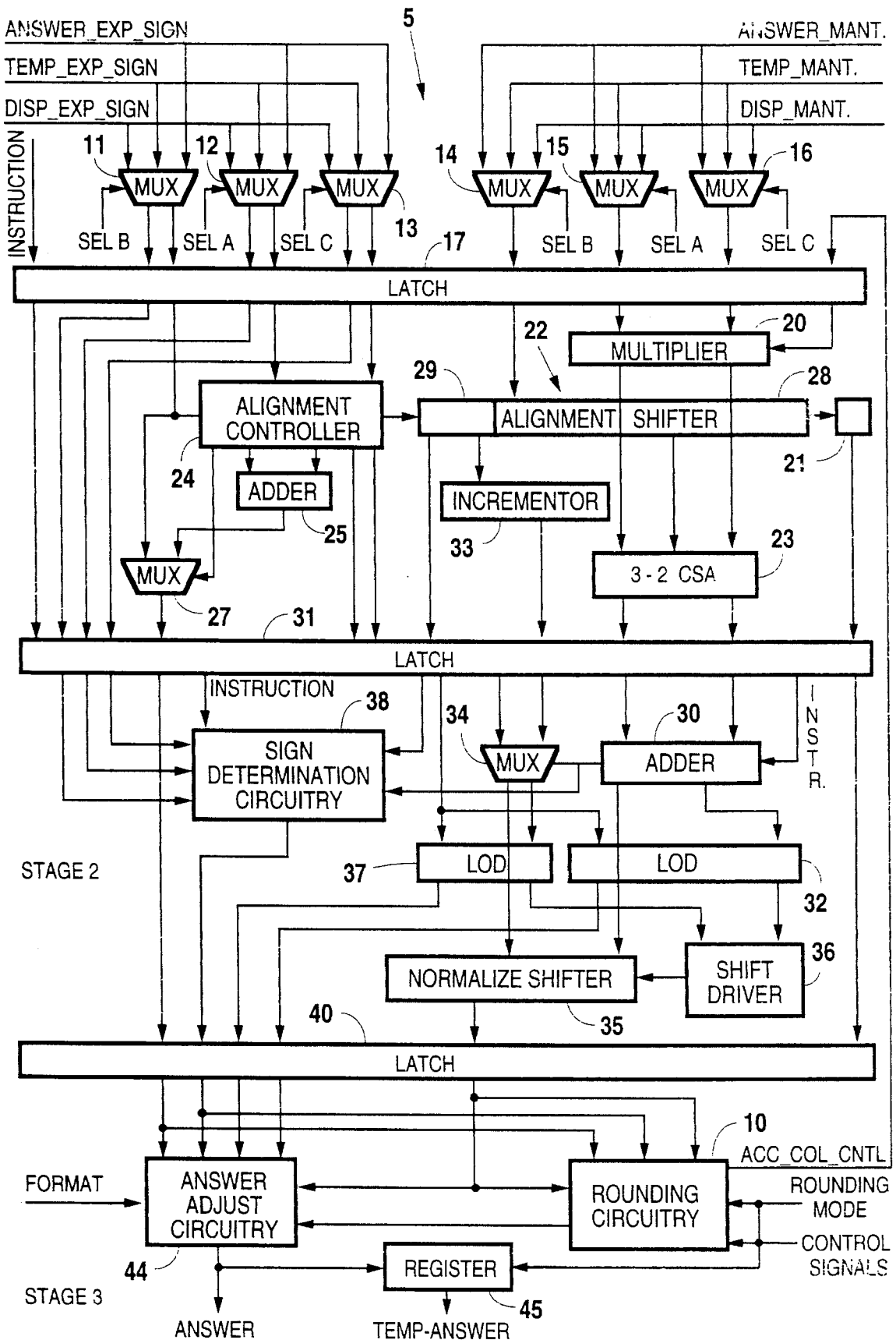
FIG. 1 is a block diagram illustrating a pipeline of a floating point unit implementing the rounding circuit of the preferred embodiment.
Figure 2:
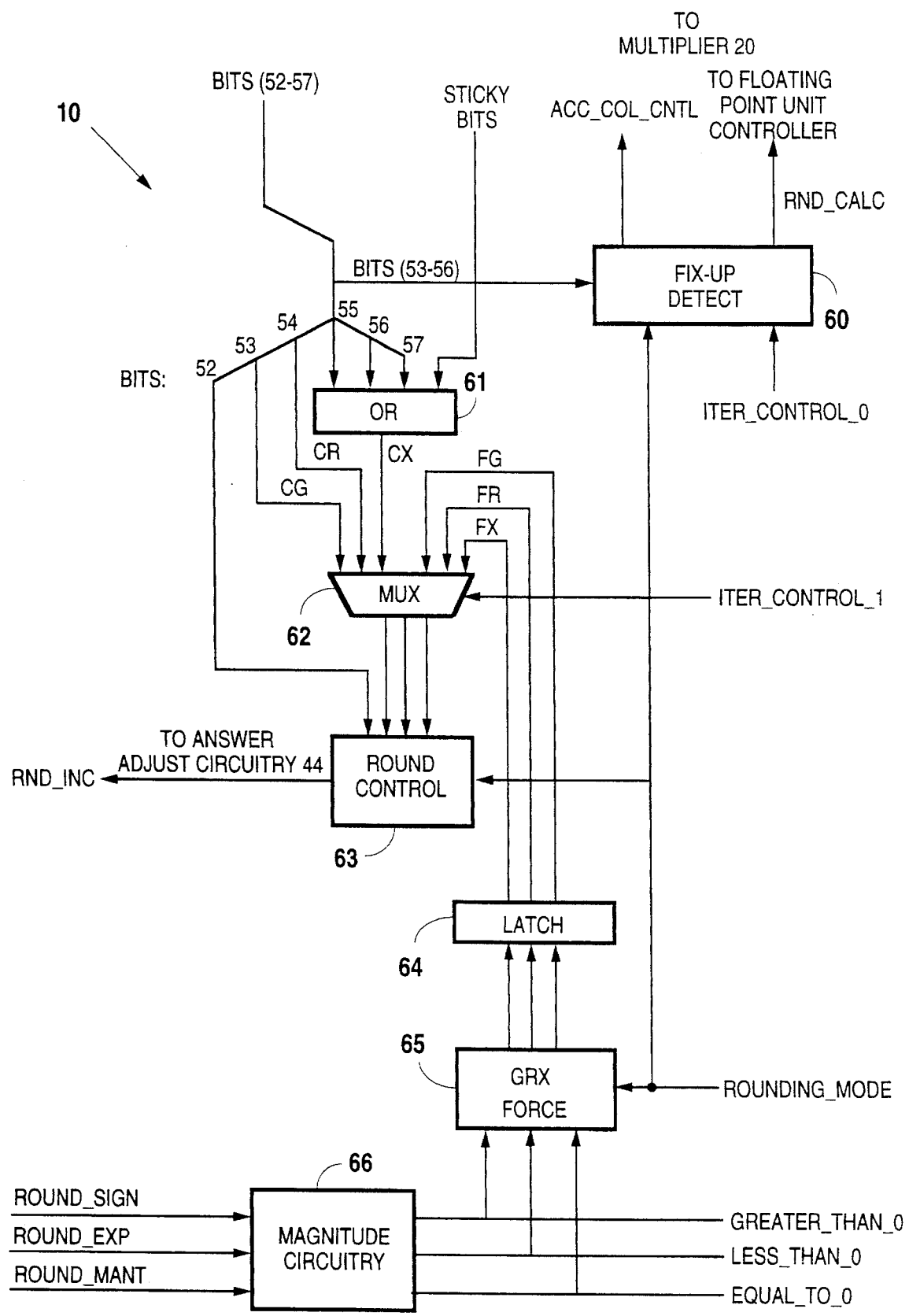
FIG. 2 is a block diagram illustrating the rounding circuit of the preferred embodiment.

An illustrative embodiment of the present invention and its advantages is better understood by referring to FIGS. 1–3 of the drawings, like numerals being used for like and corresponding parts of the accompanying drawings. In FIGS. 1 and 2, although all information paths are shown with a single line, each information path transfers multiple bits of information. Likewise, the components of the preferred embodiment operate in response to multiple bits of information unless otherwise specified. Additionally, in determining the position of a bit within any bit field, the most significant bit of the bit field is termed $bit_0$.

FIG. 1 illustrates a three-stage execution pipeline 5 of a floating point unit that includes rounding circuitry 10. Pipeline 5 includes three stages to permit the concurrent operation of the stages during any one clock cycle. The following description of pipeline 5 and the implementation of rounding circuitry 10 therein is for the purpose of disclosure and to aid in the understanding of this preferred embodiment. Those skilled in the art will recognize that rounding circuitry 10 may be implemented into any pipeline of a floating point unit with only the inclusion of circuitry that modifies the multiplier of the pipeline such that it includes a correction factor column controlled by rounding circuitry 10.

Pipeline 5 performs a multiplication between an A and a C operand followed by the addition of a B operand to or the subtraction of a B operand from the result of the multiplication between the A and C operands. Pipeline 5 performs the above standard arithmetic operations to provide the floating point unit with the capability of executing a variety of other arithmetic operations. Illustratively, many arithmetic operations such as division or square root may be executed as a series of subtractions, multiplications, and additions. Particularly, division between two operands may be approximated by a Taylor series expansion formulated by iteratively executing a series of subtractions, multiplications, and additions.

The floating point unit includes a controller (not shown) that outputs an instruction (e.g., add or subtract), the type of rounding mode, and the control signals associated with each rounding mode to pipeline 5. The floating point unit controller further controls multiplexers 11–16 via select lines SelA–C to multiplex to pipeline 5 the operands required to execute the instruction. After pipeline 5 executes the instruction, the floating point unit controller directs pipeline 5 to output the answer to a floating point unit answer register (not shown). If the instruction is one in a series of instructions to approximate an arithmetic operation (e.g., division or square root), the answer output from pipeline 5 is an intermediate answer re-input into pipeline 5 by the floating point unit controller as an operand for a following instruction in the instruction series. At the end of the instruction series, the floating point unit controller directs pipeline 5 to output the answer to the floating point unit answer register.

To begin the execution of an instruction, the floating point unit controller launches an instruction to latch 17 during the last clock cycle of a prior instruction. Concurrently, the floating point unit controller controls multiplexers 11–16 via select lines SelA–C to output to latch 17 the B, A, and C operands associated with the launched instruction. Specifically, multiplexers 11–13 output the sign and exponent of the B, A, and C operands, respectively, which were input to multiplexers 11–13 on bus DISP_EXP_SIGN. Similarly, multiplexers 14–16 output the mantissa of the B, A, and C operand, respectively, which were input to multiplexers 14–16 on bus DISP_MANT.

Latch 17 latches each of the B, A, and C signs, exponents, and mantissas output from multiplexers 11–16 and the instruction output from the floating point unit controller. Latch 17 separates stage 1 of pipeline 5 from the control circuitry of the floating point unit so that the floating point unit controller can launch an instruction and the instruction's associated operands during the execution of a prior instruction by stage 1 of pipeline 5. At the beginning of the next clock cycle, latch 17 outputs the instruction and A, B, and C sign to latch 31; the B exponent to alignment controller 24 and multiplexer 27; the A and C exponents to alignment controller 24; the B mantissa to alignment shiftier 22; and the A and C mantissas to multiplier 20.

Pipeline 5 includes multiplier 20 which is a Booth encoded Wallace tree multiply array. The multiply-add array includes 27 partial product generators (PPG's) that conditionally shift and negate the A operand to create 27 partial products. In this preferred embodiment, circuitry controlled by rounding circuitry 10 expands each PPG one additional bit so that multiplier 20 includes a correction factor column (described herein with reference to FIG. 3).

Multiplier 20 does not require the input of an instruction from the floating point controller to execute a multiplication. Once multiplier 20 receives the A mantissa and C mantissa, the PPG's of multiplier 20 multiply the A mantissa and C mantissa to produce a carry and sum of partial products. After calculating the carry and sum, multiplier 20 outputs the carry and sum to 3-2 carry-save-add (CSA) 23. If only addition is required of pipeline 5, the C operand will equal one so that multiplier 20 outputs the A mantissa to 3-2 CSA 23.

Pipeline 5 includes alignment controller 24 to control the addition of a B operand to or the subtraction of a B operand from the product of the A operand and C operand. Alignment controller 24 develops the control signals necessary to add or subtract the B operand by determining whether the B exponent is greater than or equal to the exponent resulting from the operation performed between the A operand and C operand (hereinafter referred to as the AC exponent). Alignment control 24 inputs the A exponent and C exponent output from latch 17 and adds those exponents together to determine the value of the AC exponent. After determining the AC exponent, alignment controller 24 inputs the B exponent and compares the B exponent with the AC exponent to determine whether the B exponent is greater than or equal to the AC exponent. Alignment controller 24 controls alignment shifter 22, multiplexer 27, leading ones detect (LOD) 32, leading ones detect (LOD) 37 and provides input for LOD 37 and sign determination circuitry 38 in accordance with its determination of whether the B exponent is greater than or equal to the AC exponent.

Pipeline 5 includes alignment shifter 22 to shift the B mantissa output from latch 17 so that the B mantissa may be added to or subtracted from the result of the multiplication between the A mantissa and the C mantissa (hereinafter referred to as the AC result). The B mantissa must be shifted because pipeline 5 cannot perform an addition or subtraction between the B mantissa and the AC result unless the B exponent equals the AC exponent.

In determining whether the B exponent is greater than or equal to the AC exponent, alignment controller 24 also calculates the exact difference in magnitude between the B exponent and the AC exponent. The difference in magnitude between the B exponent and the AC exponent corresponds to the shift value (i.e., the number of shifts required to align the B mantissa with the AC result such that the B exponent equals the AC exponent). After calculating the shift value, alignment controller outputs a shift control signal that actuates alignment shifter 22 to shift the B mantissa the appropriate number of bits. Alignment shifter 22 inputs the B mantissa with the most significant bit (i.e., far left bit) of the B mantissa aligned with its most significant bit to provide a reference that allows alignment controller 24 to calculate the appropriate shift value.

In this preferred embodiment, alignment shifter 22 includes a total of 161 bits and is separated into MADDRANGE (multiplication add) bit field 28 and B-path bit field 29. MADDRANGE bit field 28 includes a number of bits equal to the maximum number of bits resulting from a multiplication between an A mantissa and a C mantissa in double precision format plus the correction factor column. Thus, MADDRANGE bit field 28 includes 107 bits, while B-path bit field 29 includes the remaining 54 bits of alignment shifter 22.

Alignment controller 24 controls alignment shifter 22 to shift the B mantissa stored therein one bit to the right until the B exponent equals the AC exponent. If the B exponent is less than the AC exponent, it is possible that bits of the B mantissa will be shifted beyond MADDRANGE bit field 22. Any bits of the B mantissa shifted beyond MADDRANGE field 28 are not discarded but are shifted into register 21 as sticky bits. Any sticky bits shifted into register 21 are utilized by rounding circuitry 10 in rounding the result before output from pipeline 5 (described herein with reference to FIG. 2). Alternatively, if the B exponent is greater than the AC exponent, then bits of the B mantissa remain within B-path bit field 29 (hereinafter referred to a B-path bits). B-path bits are not discarded but are utilized by pipeline 5 in calculating the result of the operation of A*C+B (described herein).

Pipeline 5 includes adder 25 to input the A exponent and C exponent and add those exponents together to produce the AC exponent. Pipeline 5 includes multiplexer 27 to permit the selection of either the B exponent or the AC exponent for output to answer adjust circuitry 44 to supply the appropriate exponent for the answer. Alignment controller 24 connects to multiplexer 27 via select lines that allow alignment controller 24 to activate multiplexer 27 to pass either the B exponent or the AC exponent calculated by adder 25. If alignment controller 24 determines the B exponent is greater than or equal to the AC exponent then it triggers multiplexer 27 to output the B exponent to answer adjust circuitry 44. Alternatively, if the B exponent is less than the AC exponent, alignment controller 24 triggers multiplexer 27 to output the AC exponent to answer adjust circuitry 44.

Pipeline 5 includes 3-2 carry-save-add (CSA) 23 to input the carry and sum output from multiplier 20 and the bits of the B mantissa contained within MADDRANGE bit field 28 (hereinafter referred to as the MADDRANGE bits) and compress those three inputs into a carry and sum output. If only a multiply operation is required of pipeline 5, the B operand is set to 0 so that multiplier 20 outputs the AC result to 3-2 CSA 23.

Pipeline 5 includes latch 31 to separate stage 1 of pipeline 5 from stage 2 so that both stages can operate concurrently.

At the expiration of each clock cycle, latch 31 latches the instruction output from latch 17, the output from 3-2 CSA 23, any sticky bits within register 21, any B-path bits within B-path bit field 29, and the output from incrementor 33 which is the increment of any B-path bits (described herein). Latch 31 further latches the exponent output from multiplexer 27, the sign signal output from alignment controller 24 indicating the result of the comparison between the B exponent and the AC exponent, the LOD enable signal, the B sign, the A sign, and the C sign. Latch 31 holds the above information latched at the end of a clock cycle until the beginning of the next clock cycle to permit concurrent operation of stage 1 and stage 2 by the execution of an instruction in stage 1 from interfering with the execution of an instruction by stage 2. Consequently, at the beginning of the next clock cycle, latch 31 outputs the instruction to adder 30 and sign determination circuitry 38; the carry and sum developed by 3-2 CSA 23 to adder 30; the incremented and unincremented B-path bits to multiplexer 34; the sign signal and A, B, and C signs to sign determination circuitry 38; the LOD enable signal to LOD's 32 and 37; and the sticky bits and exponent to latch 40. Pipeline 5 includes adder 30 to perform an addition on the carry and sum output from 3-2 CSA 23.

Pipeline 5 includes sign determination circuitry 38 to ascertain the sign of the answer output from pipeline 5 and to provide an input to leading ones detect (LOD) 37 that indicates whether the B exponent has increased or decreased. Sign determination circuitry 38 inputs from latch 31 the instruction and the sign signal indicating the result of the comparison between the B exponent and the AC exponent. Sign determination circuitry 38 further inputs a carry signal from adder 30 and the A, B, and C signs output from latch 31.

Pipeline 5 includes multiplexer 34, normalize shifter 35, and incrementor 33 to perform any necessary modification of the output from adder 30. After adder 30 completes the addition of either the carry and sum or complemented carry and sum, normalize shifter 35 inputs the output of adder 30 with the least significant bit (i.e. the far right bit) of the output from adder 30 aligned with its least significant bit. If B-path bit field 29 contained no B-path bits because the AC exponent was larger than or equal to the B exponent, then the output from adder 30 forms the result for the operation of A*C+B (hereinafter referred to as the ACB result).

However, if B-path bit field 29 contained B-path bits because the B exponent was greater than the AC exponent, then the output from adder 30 must be modified before it forms the ACB result. Incrementor 33 increments the B-path bits to provide for the situation where the addition within adder 30 produces a carry. Multiplexer 34 permits the selection between incremented B-path bits and unincremented B-path bits. If the addition within adder 30 results in a carry, adder 30 outputs a carry signal to multiplexer 34 triggering multiplexer 34 to output the incremented B-path bits to normalize shifter 35. Alternatively, if the addition within adder 30 produces no carry, adder 30 outputs a carry signal that triggers multiplexer 34 to output the unincremented B-path bits to normalize shifter 35.

The inputting of either the incremented or unincremented B-path bits into normalize shifter 35 modifies the output from adder 30 because normalize shifter 35 inputs the B-path bits with the least significant bit of the B-path bits residing in the bit place directly to the left of the most significant bit of the output from adder 30. Consequently, the B-path bits and the output from adder 30 are concatenated to form an ACB result that reflects the greater magnitude of the B exponent than the AC exponent. Conversely, if the AC exponent is larger than or equal to the B exponent, no B-path bits will exist, resulting in the output from adder 30 forming the ACB result.

Pipeline 5 includes normalize shifter 35, shift driver 36, leading ones detect (LOD) 32, and leading ones detect 37 to accomplish the normalization of the ACB result contained within normalize shifter 35 as required by the IEEE 754-1985 standard. Alignment controller 24 controls LOD's 32 and 37 in accordance with its determination of whether the B exponent is greater than or equal to the AC exponent. If alignment controller 24 determines the B exponent is less than or equal to the AC exponent, then there will be no B-path bits and the output of adder 30 will form the complete ACB result. Consequently, alignment controller 24 enables LOD 32 and disables LOD 37. Once enabled, LOD 32 detects the bit position of the leading one within the output from adder 30 and determines the shift value (i.e, the number of shifts) required to normalize the ACB result.

Alternatively, if alignment controller 24 determines the B exponent is greater than the AC exponent, then the output of adder 30 must be modified with the B-path bits as previously described. Consequently, alignment controller 24 enables LOD 37 and disables LOD 32. Once enabled, LOD 37 detects the leading one within the B-path bits and determines the shift value (i.e, the number of shifts) required to normalize the ACB result.

LOD 37 not only determines the shift value required to normalize the ACB result, but it also determines whether the exponent of the final answer must be adjusted. When the B exponent exceeds the AC exponent, the addition or subtraction performed by adder 30 might result in an ACB result that requires an exponent having a value either one greater or one less than the value of the B exponent outputted to answer adjust circuitry 44 by multiplexer 27. LOD 37 inputs the shift value calculated by alignment controller 24 and compares that shift value with the shift value it determined was necessary to normalize the ACB result. If LOD 37 determines a difference between the two shift values, then the exponent for the final answer must be adjusted.

However, LOD 37 must still determine whether the exponent must be increased or decreased. LOD 37 inputs the sign of the final answer from sign determination circuitry 38 to determine the exponent adjustment. Answer adjust circuitry 44 includes an adder that adjusts the exponent of the answer in accordance with the exponent status signal input from LOD 37.

Consequently, answer adjust circuitry 44 includes a converter that inputs the shift value determined by LOD 32 and converts the shift value to a corresponding exponent. Answer adjust circuit further includes a comparator that compares the B or AC exponent output from multiplexer 27 to the shift value exponent. If the comparator determines the B or AC exponent differs from the shift value exponent, then the B or AC exponent must be either increased or decreased. Answer adjust circuitry 44 examines the sign of the answer input from sign determination circuitry 38 to determine the exponent adjustment.

Once the enabled LOD 32 or 37 determines the shift value necessary to normalize the ACB result within normalize shifter 35, the enabled LOD 32 or 37 outputs the shift value to shift driver 36. Shift driver 36 inputs the normalize shift value and controls normalize shifter 35 to shift the ACB result contained therein until the leading one of the ACB result resides to the left of the most significant bit of normalize shifter 35 as required under the IEEE standards.

In this preferred embodiment, normalize shifter 35 is a three stage shifter that includes a total of 161 bits to accommodate the bits received from adder 30 as well as any B-path bits. Normalize shifter 35 inputs the ACB result with the least significant bit of the ACB result aligned with its least significant bit to provide shift driver 36 with a reference that allows the correct shifting of the ACB result in accordance with the normalize shift value. Normalize shifter 35 performs a major shift, a mid-shift, and/or a minor shift in response to the normalize shift value input from shift driver 36. Shift driver 36 initiates a major shift when the ACB result must be shifted 0, 16, 32, 48, 64, 80, 96, 112, 128, 144, or 160 bits; a mid-shift when the ACB result must be shifted 0, 4, 8, or 12 bits; and/or a minor shift when the ACB result must be shifted 0, 1, 2, or 3 bits. Consequently, shift driver 36 outputs three sets of shift control signals that activate normalize shifter 35. The three sets of shift control signals are grouped in eleven select lines that produce a major shift, four select lines that produce a mid-shift, and four select lines that produce a minor shift. Thus, after inputting a normalize shift value from one of LOD's 32 or 37, shift driver 36 outputs a shift control signal(s) on an appropriate select line(s) to enable normalize shifter 35 and produce a shift in accordance with the normalize shift value. For example, when a shift of 106 bits is required for normalization of the ACB result, shift driver 34 activates the major shift select line corresponding to a shift of 96 bits, the mid-shift select line corresponding to a shift of 8 bits, and the minor shift select line corresponding to a shift of 2 bits. Accordingly, shift driver 34 activates the major shift select lines, mid-shift select lines, and/or minor shift select lines in any combination to produce shifts within normalize shifter 35 from 0 to 161 bits.

Pipeline 5 includes latch 40 to separate stage 2 of pipeline 5 from stage 3 so that both stages can operate concurrently. At the expiration of each clock cycle, latch 40 latches the sticky bits and exponent output from latch 31, the normalized ACB result output from normalize shifter 35, the sign output from sign determination circuitry 38, the shift value output from LOD 32, and the exponent adjust signal output from LOD 37. However, because alignment controller 24 only enables either LOD 32 or LOD 37, latch 41 actually latches only one of their signals during any one clock cycle.

Latch 40 holds the above information latched at the end of a clock cycle until the beginning of the next clock cycle to permit concurrent operation of stage 2 and stage 3 by preventing the execution of an instruction in stage 2 from interfering with the execution of an instruction in stage 3. Consequently, at the beginning of the next clock cycle, latch 40 outputs the sticky bits, the answer sign, the answer exponent, and the normalized ACB result to rounding circuitry 10. Latch 40 further outputs a portion of the normalized ACB result, the answer exponent, the answer sign, and either the exponent adjust signal or shift value to answer adjust circuitry 44.

In inputting the normalized ACB result, latch 40 concatenates the ACB result with any sticky bits gathered by register 21. That is, any sticky bits originally shifted into register 21 were placed to the right of the least significant bit of the ACB result. Accordingly, the term sticky bits utilized in connection with the following description of rounding circuitry 10 refers to the bits beginning with $bit_{58}$ of the ACB result and ending with the least significant bit of any bits within register 21. Alternatively, if register 21 gathered no sticky bits then the term sticky bits refers the bits of the normalized ACB result beginning with $bit_{58}$ and ending with the least significant bit of the normalized ACB result.

After the normalization of the ACB result, rounding circuitry 10 inputs $bit_0$–$bit_{57}$ of the normalized ACB result and any sticky bits to produce round control signal RND_INC utilized to control answer adjust circuitry 44 (described herein with reference to FIG. 2). Additionally, pipeline 5 includes registers 45 to hold temporary answers utilized in determining the correct rounding of an answer mantissa when the answer mantissa was produced in response to an arithmetic operation requiring the iteration of a series of instructions (described herein with reference to FIG. 2).

Answer adjust circuitry 44 inputs the 53 most significant bits of the ACB result (i.e., $bit_0$–$bit_{52}$) to form an answer mantissa having the number of bits required in the double precision format of the IEEE 754-1985 standard. Answer adjust circuitry 44 includes an incrementor and a multiplexer controlled by the round control signal RND_INC output from rounding circuitry 10. If rounding circuitry 10 determines that the answer mantissa must be incremented, it outputs a round control signal RND_INC that controls the multiplexer to output the incremented version of the answer mantissa. Conversely, if rounding circuitry 10 determines that the answer mantissa provides the correct answer, it outputs a round control signal RND_INC that controls the multiplexer to output the unincremented version of the answer mantissa. Answer adjust circuitry 44 inputs a format signal which specifies the IEEE 754-1985 precision standard for the incremented and unincremented versions of the answer mantissa.

As previously described, answer adjust circuitry 44 increments or decrements the exponent of the final answer if required. Answer adjust circuitry 44 then inputs the proper sign and associates both the exponent and sign with the answer mantissa. After associating both the exponent and sign with the answer mantissa, answer adjust circuitry outputs the sign, mantissa, and exponent as the final answer.

With reference to FIG. 2, the functioning of rounding circuitry 10 to determine a round control signal RND_INC for non-iterative arithmetic operations will be described. Rounding circuitry 10 inputs from latch 40 $bit_{52}$–$bit_{57}$ and the sticky bits to permit the determination of whether an answer mantissa must be incremented to reflect the correct answer. OR circuitry 61 inputs $bit_{55}$–$bit_{57}$ and OR's those bits with the sticky bits to produce a calculated sticky bit CX. After determining the CX bit, OR circuitry 61 outputs the CX bit to multiplexer 62. $Bit_{53}$ which is the calculated guard bit CG and $bit_{54}$ which is the calculated round bit CR are each output directly to multiplexer 62 from latch 40. Additionally, latch 40 outputs $bit_{52}$ of the normalized ACB result directly to round control 63.

Rounding circuitry 10 inputs the rounding mode signal to determine the particular type of IEEE 754-1985 rounding rules required for the answer mantissa. Rounding circuitry 10 further inputs the control signals ITER_control_and ITER_control_1 to ascertain whether pipeline 5 is performing an iterative operation. When pipeline 5 executes a non-iterative operation, ITER_control_disables fix-up detect 60, while ITER_control_1 controls multiplexers 62 to output the CG, CR, and CX to round control 63.

Round control 63 inputs the rounding mode signal and determines a round control signal RND_INC utilizing the CG, CR, CX, and $bit_{52}$, if necessary, in accordance with the IEEE 754-1985 rounding rules corresponding to the input rounding mode. Round control 63 includes circuitry that examines the CG, CR, CX, and $bit_{52}$ in light of the IEEE 754-1985 rounding rules to decide whether the answer mantissa must be incremented to form a correct answer.

When round control 63 determines the incremented answer mantissa must be selected, it outputs a round control signal RND_INC that controls the multiplexer within answer adjust circuitry 44 to output incremented answer mantissa. Conversely, when round control 63 determines that the answer mantissa furnishes the correct answer, it outputs a round control signal RND_INC that controls the multiplexer to output the unincremented answer mantissa.

The application of the IEEE 754-1985 rounding rules by round control 63 to the CG, CR, CX, and $bit_{52}$ will be apparent in view of the following example. If the rounding mode is round to nearest, round control 63 first examines CG. When the CG is a 0, round control 63 outputs a round control signal RND_INC that controls the multiplexer within answer adjust circuitry 44 to output the incremented answer mantissa. However, when the CG is a 1, round control 63 examines the CR and CX. If either the CR or CX is a 1, round control 63 outputs a round control signal RND_INC that controls the multiplexer to output the unincremented answer mantissa. Alternatively, if the CR and CX are both a 0, round control 63 examines $bit_{52}$. When $bit_{52}$ is a 1, round control 63 outputs a round control signal RND_INC that controls multiplexer to output the incremented answer mantissa, otherwise, round control 63 outputs a round control signal RND_INC that controls the multiplexer to output the unincremented answer mantissa.

Rounding circuitry 10 includes fix-up detect 60, latch 64, GRX force 65, and magnitude circuitry 66 to aid in the determination of a round control signal RND_INC for an iterative operation. Consequently for a non-iterative operation, although fix-up detect 60 receives the rounding mode signal, ITER_control_has disabled fix-up detect 60. Similarly, ITER_control_1 controls multiplexer 62 to output the CG, CR, and CX because the forced guard bit FG, the forced round bit FR, and the forced sticky bit FX produced by magnitude circuitry 66 and GRX force 65 are not required for non-iterative operations.

As illustrated in FIG. 3, multiplier 20 is a Booth encoded Wallace tree multiply-add array that includes 27 partial product generators $PPG_0-PPG_{26}$. Each PPG is 53 bits combined with an additional bit that functions as a correction factor bit for the rounding calculations of iterative operations (described herein). Accordingly, the correction factor bits form a correction factor column 70 within the multiply-add array of multiplier 20. During any arithmetic operation other than a rounding calculation, fix-up detect 60 sets each correction factor bit in correction factor column 70 to a 0 so that correction factor column 70 does not affect the result output from multiplier 20. Thus, for non-rounding operations although multiplier 20 outputs a 107 bit result, only the 106 most significant bits reflect the result because the 107th bit will always be a 0. However, for certain rounding calculations, fix-up detect 60 sets each bit within correction factor column 70 such that the result produced by the multiply-add array may be utilized in the determination of the correct final answer (described herein).

As previously indicated, many arithmetic operations such as division or square root are executed by pipeline 5 as a series of instructions. Illustratively, division between two operands may be approximated by a Taylor series expansion formulated by iteratively executing a series of subtractions, multiplications, and additions.

Thus, to begin an iterative operation, the floating point unit controller launches the first instruction in the instruction series and controls multiplexers 11–16 via select lines SelA-C to multiplex to pipeline 5 the operands required to execute the first instruction. While pipeline 5 executes the first instruction, the floating point unit controller launches the next instruction and controls multiplexers 11–16 via select lines SelA-C to multiplex to pipeline 5 any new operand(s) required to execute the next instruction.

Furthermore, the floating point unit controller controls multiplexers 11–16 to multiplex to pipeline 5 the answer output from answer adjust circuitry 44. Specifically, one of multiplexers 11–13 outputs the sign and exponent of the answer which was input to multiplexers 11–13 from answer adjust circuitry on bus ANSWER_EXP_SIGN. Similarly, one of multiplexers 14–16 outputs the mantissa of the answer which was input to multiplexers 14–16 from answer adjust circuitry 44 on bus ANSWER_MANT. The floating point unit controller effects the input of the answer to the first instruction because that answer is an intermediate answer required as one of the operands for the next instruction.

Accordingly, the floating point unit controller sequentially launches each instruction in the instruction series, controls multiplexers 11–16 to multiplex to pipeline 5 any new operand(s) required for each instruction, and controls multiplexers 11–16 to multiplex to pipeline 5 the intermediate answer output from answer adjust circuitry 44 as an operand for a following instruction until the instruction series is completed. Upon the completion of the instruction series, the normalized ACB result reflects an approximate answer that contains a sufficient number of bits to permit the determination by rounding circuitry 10 of a final answer considered correct under the IEEE 754-1985 standard.

If rounding circuitry 10 detects that the approximate answer is not close to a rounding boundary (i.e., a boundary that requires the incrementing of the approximate answer as defined by the IEEE 754-1985 standard), rounding circuitry 10 utilizes the CG, CR, CX and possibly $bit_{52}$ as previously described to determine the correct final answer for the iterative operation. Alternatively, if rounding circuitry 10 detects the approximate answer is close to a rounding boundary, a rounding calculation is required for the determination of the correct final answer.

In this preferred embodiment, the normalized ACB result produced during an iterative operation includes 57 bits. However, those skilled in the art will recognize that as little as 55 bits will provide sufficient accuracy to permit the determination of the correct final answer. Any bits calculated beyond the 55th bit decrease the number of times when a rounding calculation is necessary in the determination of the correct final answer.

Once the normalized ACB result has a 57 bit accuracy, the final answer for the iterative operation may be determined. Answer adjust circuitry 44 inputs the 53 most significant bits of the ACB result (i.e., $bit_0-bit_{52}$) to form an answer mantissa having the number of bits required in the double precision format of the IEEE 754-1985 standard. Furthermore, answer adjust circuitry inputs from latch 40 the answer exponent and sign.

The control signal ITER_control_2 controls registers 45 to input from answer adjust circuitry the answer sign, the answer exponent, and the 53 most significant bits of the ACB result to form a temporary answer (hereinafter referred to as the truncated answer). Additionally, registers 45 input and store from answer adjust circuitry 44 an incremented version of the temporary answer (hereinafter referred to as the incremented answer). Registers 45 input and store the truncated answer and incremented answer to furnish an operand for a rounding calculation if such a calculation is required.

A rounding calculation is necessary to ascertain the final answer mantissa whenever the mantissa within answer adjust circuitry 44 is not sufficiently close to the IEEE 754-1985 correct answer. Whether an answer mantissa is close enough to the IEEE 754-1985 correct answer may be determined from the rounding mode and the bits calculated beyond the 53 bits required for a double precision mantissa. In this preferred embodiment, fix-up detect 60 utilizes $bit_{53}$–$bit_{56}$ (termed accuracy bits), however, those skilled in the art will recognize that only $bit_{53}$ and $bit_{54}$ are actually necessary and that any number of additional bits may be used.

In this preferred embodiment, a rounding calculation determines whether the selected answer (i.e., either the incremented mantissa, exponent, and sign or unincremented mantissa, exponent, and sign) within answer adjust circuitry 44, which is the approximate answer, is less than or equal to the correct answer. Approximate answers are always either less than or equal to correct answers because the algorithms implementing iterative operations are selected to produce such approximate answers. Accordingly, a rounding calculation is a restatement of the iterative operation being performed. Illustratively, for the division q=a/b, the precise rounding calculation becomes 0=a−b*q. However, since the correct answer (q) is not known, the approximate answer plus a correction factor is substituted for the correct answer (q). The result of the rounding calculation is then compared to 0 to determine whether the incremented or unincremented answer mantissa must be selected.

The correction factor is determined based upon where the approximate answer falls relative to an IEEE rounding boundary. In this preferred embodiment, if the approximate answer falls near an IEEE rounding boundary such that the guard bit of the approximate answer could transition from 0 to 1, the correction factor is set to append a bit to the approximate answer. Alternatively, if the approximate answer falls near an IEEE rounding boundary such that the least significant bit of the approximate answer could transition, the correction factor is set to increment the approximate answer.

For the purposes of disclosure and to aid in the understanding of this preferred embodiment, the iterative operation of division and its associated rounding calculation will be described. Those skilled in the art will understand how to establish the rounding calculations and set the correction factor for other iterative arithmetic operations in light of the following.

Referring again to FIG. 2, if the rounding mode is round to nearest, fix-up detect 60 examines $bit_{53}$–$bit_{56}$ to detect when those bits are either 0111 or 1111 to determine if the approximate answer is near an IEEE rounding boundary. During an iterative operation, the control signal ITER_control_ enables fix-up detect 60 which inputs the rounding mode signal and $bit_{53}$–$bit_{56}$. Fix-up detect 60 examines $bit_{53}$–$bit_{56}$ in light of the rounding mode to decide if a rounding calculation is required. When $bit_{53}$–$bit_{56}$ are not 0111 or 1111, fix-up detect 60 determines no rounding calculation is required. Consequently, the CG, CR, CX, and possibly $bit_{52}$ may be used to finalize the answer mantissa because the mantissa within answer adjust circuitry 44 is sufficiently close to the IEEE 754-1985 correct answer. Regardless of whether fix-up detect 60 determines that a rounding calculation is necessary, the control signal ITER_control_1 signal controls multiplexer 62 to output the CG, CR, and CX to round control 63. Round control 63 inputs the CG, CR, CX, $bit_{52}$, and the rounding mode and determines in accordance with the IEEE 754-1985 rounding rules whether the incremented answer mantissa must be selected.

When $bit_{53}$–$bit_{56}$ are 0111, fix-up detect asserts the RND_CALC line to inform the floating point unit controller that a rounding calculation is required. For the illustrative iterative operation of an A operand divided by a B operand (A/B), that rounding calculation must determine whether the A operand minus the B operand times the truncated answer (TA) plus the correction factor (cf) [A−B*(TA+cf)] is greater than or less than zero. In this instance, the correction factor must be set to append a bit to TA because the guard bit is 0 and could transition to a 1. To produce such a correction factor, fix-up detect 60 asserts a control signal ACC_COL_CNTL (described herein).

To begin the above rounding calculation, fix-up detect 60 asserts the RND_CALC line and outputs to latch 17 a control signal ACC_COL_CNTL in the same clock cycle during which fix-up detect 60 ascertained the values of $bit_{53}$–$bit_{56}$. In response to the assertion of the RND_CALC line, the floating point unit controller launches to latch 17 the instruction associated with the necessary rounding calculation. The floating point unit controller further controls multiplexers 11–16 to output to latch 17 the A operand, B operand, and the truncated answer. As previously described, selected ones of multiplexers 11–13 receive the A and B exponent and sign from bus DISP_EXP_SIGN, while selected ones of multiplexers 14–16 receive the A and B mantissa from bus DISP_MANT. Furthermore, a selected one of multiplexers 11–13 receives the sign and exponent of the truncated answer (hereinafter referred to as the TEMP sign and TEMP exponent) from bus TEMP_EXP_SIGN, while a selected one of multiplexers 14–16 receives the mantissa of the truncated answer (hereinafter referred to as the TEMP mantissa) from bus TEMP_MANT. Specifically, multiplexer 11 outputs the A sign and A exponent, multiplexer 12 outputs the B sign and B exponent, and multiplexer 13 outputs the TEMP sign and exponent. Similarly, multiplexer 14 outputs the A mantissa, multiplexer 15 outputs the B mantissa, and multiplexer 16 outputs the TEMP mantissa.

At the beginning of the next clock cycle, latch 17 outputs the B mantissa and TEMP mantissa to multiplier 20. Furthermore, latch 17 outputs the control signal ACC-COL-CNTL to multiplier 20, resulting in the placing of a 1 in each bit of correction factor column 70 (see FIG. 3). By placing a 1 in each bit of correction factor column 70, the control signal ACC_COL_CNTL appends a 54th bit to the TEMP mantissa to introduce the correction factor (hereinafter referred to as the TEMP_CF mantissa). Multiplier 20 multiplies the B mantissa and the TEMP_CF mantissa to form a 107 bit carry and sum result that it outputs to 3-2 CSA 23. Although a correction factor was appended to only one operand input into multiply array 20, those skilled in the art will recognize that a correction factor may also be appended to the other operand.

Latch 17 further outputs the A mantissa to alignment shifter 22; the A exponent to multiplexer 27, the B and TEMP exponents to alignment controller 24; and the A, B, and TEMP sign to latch 31. Alignment controller 24, alignment shifter 22, and 3-2 CSA 23 each operate as previously described to produce and output to latch 31 a compressed carry and sum for the A mantissa and the result of the multiplication between the B mantissa and the TEMP_CF mantissa. Furthermore, alignment controller 24, adder 25, and multiplexer 27 furnish to latch 31 an exponent for the answer to the rounding calculation (hereinafter referred to as the ROUND exponent). Additionally, alignment controller 24 outputs the sign signal and LOD enable signal, while incrementor 33 and register 21 perform there previously described functions.

During the same clock cycle where stage 1 of pipeline 5 executes the rounding calculation instruction, the floating point unit controller controls one of multiplexers 11–13 and one of multiplexers 14–16 to output to latch 17 from register 45 via buses TEMP_EXP_SIGN and TEMP_MANT the truncated answer (hereinafter referred to as the basis answer). The floating point unit controller controls pipeline 5 to pass the basis answer unchanged because it forms the basis of the final answer to the iterative operation. Furthermore, the floating point unit controller launches the basis answer into pipeline 5 directly behind (i.e., the clock cycle after) the rounding calculation in order to minimize the number of clock cycles necessary to compute the correct final answer. That is, the basis answer inputs into answer adjust circuitry 44 only one clock cycle behind the input of the rounding calculation result into rounding circuitry 10 for determination of correct final answer. Accordingly, rounding circuitry 10 reduces the number of clock cycles required to determine the round control signal RND_INC to a minimum of four clock cycles.

At the beginning of the clock cycle following the execution of the rounding calculation instruction, latch 31 outputs the compressed carry and sum of the A mantissa and the result of the multiplication between the B mantissa and the TEMP_CF mantissa to adder 30. Adder 30 subtracts the result of the multiplication between the B operand and the TEMP_CF from the A operand to produce a rounding calculation result. Adder 30 outputs the rounding calculation result to normalize shifter 35. Multiplexer 34, LOD's 32 and 37, shift driver 36, and normalize shifter operate as previously described to produce a normalized rounding calculation result. Additionally, sign determination circuitry 38 inputs the A, B, and TEMP signs and determines the sign of the rounding calculation result (hereinafter referred to as the ROUND sign). Normalize shifter 35 and sign determination circuitry 38 output to latch 40 the rounding calculation result and round sign, respectively. Additionally, during the execution of the rounding calculation instruction by stage 2 of pipeline 5, latch 31 latches the TEMP exponent, sign, and mantissa.

At the beginning of the next clock cycle, latch 31 outputs the basis answer into stage 2 of pipeline 5. Similarly, latch 40 outputs to rounding circuitry 10 the ROUND sign, ROUND exponent, and the 53 most significant bits (i.e., $bit_0$–$bit_{52}$) of the normalized rounding calculation result (hereinafter referred to as the ROUND mantissa).

Referring again to FIG. 2, magnitude circuitry 66 inputs from latch 40 the ROUND sign, exponent, and mantissa to determine whether the rounding calculation produced a result greater than or less than zero. Magnitude circuitry 66 examines the ROUND sign. When the ROUND sign is negative, the rounding calculation result is less than 0, otherwise, it is greater than 0.

GRX force 65 inputs the rounding mode and the output of magnitude circuitry 66 to determine the values for the forced guard bit FG, forced round bit FR, and forced sticky bit FX. In this illustration of the round to nearest rounding mode, when the rounding calculation result exceeds 0, the basis answer forms the final answer. Consequently, GRX force 65 sets the FG to a 0, the FR to a 1, and the FX to a 1. Conversely, when the rounding calculation result is less than 0, the basis answer must be incremented, resulting in GRX force 65 setting the FG to 1, the FR to a 0, and the FX to a 1. After determining the values for the FG, FR, and FX, GRX force 65 outputs the FG, FR, and FX to a latch 64.

During the clock cycle that magnitude circuitry 66 and GRX force 65 determine the FG, FR, and FX, stage two of pipeline 5 outputs to latch 40 the basis answer. At the beginning of the next clock cycle, latch 40 outputs the basis answer to answer adjust circuitry 44.

Also at the beginning of the next clock cycle, latch 64 outputs the FG, FR, and FX to multiplexer 62. During this cycle, ITER_control_1 controls multiplexer 62 to output the FG, FR, and FX to round control 63. Round control 63 inputs the rounding mode and the FG, FR, and FX to determine whether the basis answer must be incremented. Round control 63 applies the IEEE 754-1985 rounding rules to the FG, FR, and FX to determine whether the multiplexer to selects the incremented basis answer or the unincremented basis answer.

In another illustration of the operation of rounding circuitry 10, when the rounding mode is round to nearest, round to zero, round to positive infinity for negative results, or round to negative infinity for positive results and $bit_{53}$–$bit_{56}$ are 1111, fix-up detect 60 asserts the RND_CALC line to inform the floating point unit controller that a rounding calculation is required. For the illustrative iterative operation of an A operand divided by a B operand (A/B), that rounding calculation must determine whether the A operand minus the B operand times the truncated answer (TA) plus the correction factor (cf) [A−B*(TA+Cf)] is greater than, equal to, or less than zero. In this instance, the correction factor must be set to increment TA because the least significant bit of TA could transition.

In response to the assertion of the RND_CALC line, the floating point unit controller begins the above rounding calculation by launching into pipeline 5 the instruction associated with the necessary rounding calculation as previously described. The floating point unit controller further controls multiplexers 11–16 to output into pipeline 5 the A operand, B operand, and the incremented answer which is the TA+cf.

During the same clock cycle where stage 1 of pipeline 5 executes the rounding calculation instruction, the floating point unit controller controls one of multiplexers 11–13 and one of multiplexers 14–16 to output to latch 17 from register 45 via buses TEMP_EXP_SIGN and TEMP_MANT the truncated answer (hereinafter referred to as the basis answer). The floating point unit controller controls pipeline 5 to pass the basis answer unchanged because it forms the basis of the final answer to the iterative operation. Furthermore, the floating point unit controller launches the basis answer into pipeline 5 directly behind (i.e., the clock cycle after) the rounding calculation in order to minimize the number of clock cycles necessary to compute the correct final answer. That is, the basis answer inputs into answer adjust circuitry 44 only one clock cycle behind the input of the rounding calculation result into rounding circuitry 10 for determination of correct final answer. Accordingly, rounding circuitry 10 reduces the number of clock cycles required to determine the round control signal RND_INC to a minimum of four clock cycles.

Pipeline 5 executes the rounding calculation instruction similarly to that described heretofore to produce a ROUND mantissa, exponent, and sign. Magnitude circuitry 66 (see FIG. 2) inputs the ROUND sign, exponent, and mantissa to determine whether the rounding calculation produced a result greater than, equal to, or less than zero. Magnitude circuitry 66 examines the ROUND mantissa and exponent. When the ROUND mantissa and exponent are 0, the rounding calculation result equals 0. Conversely, if the ROUND mantissa and exponent are not 0, magnitude circuitry examines the ROUND sign. When the ROUND sign is negative, the rounding calculation result is less than 0, otherwise, the rounding calculation result is greater than 0.

GRX force 65 inputs the rounding mode and the output of magnitude circuitry 66 to determine the values for the forced guard bit FG, forced round bit FR, and forced sticky bit FX in accordance with the particular rounding mode and the IEEE 754-1985 rounding rules. After determining the values for the FG, FR, and FX, GRX force 65 outputs the FG, FR, and FX to a latch 64. At the beginning of the next clock cycle, latch 64 outputs the FG, FR, and FX to multiplexer 62. During this cycle, ITER_control_1 controls multiplexer 62 to output the FG, FR, and FX to round control 63. Round control 63 inputs the rounding mode and the FG, FR, and FX to determine whether the basis answer must be incremented. Round control 63 applies the IEEE 754-1985 rounding rules to the FG, FR, and FX to determine whether the multiplexer to selects the incremented basis answer or the unincremented basis answer.

In a further illustration of the operation of rounding circuitry 10, when the rounding mode is round to positive infinity for positive results, or round to negative infinity for negative results and $bit_{53}$–$bit_{56}$ are 1111, fix-up detect 60 asserts the RND,CALC line to inform the floating point unit controller that a rounding calculation is required. For the illustrative iterative operation of an A operand divided by a B operand (A/B), that rounding calculation must determine whether the A operand minus the B operand times the truncated answer (TA) plus the correction factor (cf) [A−B*(TA+cf)] is greater than, equal to, or less than zero. In this instance, the correction factor must be set to increment TA because the least significant bit of TA could transition.

In response to the assertion of the RND_CALC, the floating point unit controller begins the above rounding calculation by launching into pipeline 5 as previously described the instruction associated with the necessary rounding calculation. The floating point unit controller further controls multiplexers 11–16 to output into pipeline 5 the A operand, B operand, and the incremented answer which is the TA+cf.

During the same clock cycle where stage 1 of pipeline 5 executes the rounding calculation instruction, the floating point unit controller controls one of multiplexers 11–13 and one of multiplexers 14–16 to output to latch 17 from register 45 via buses TEMP_EXP_SIGN and TEMP_MANT the incremented answer (hereinafter referred to as the basis answer). The floating point unit controller controls pipeline 5 to pass the basis answer unchanged because it forms the basis of the final answer to the iterative operation. Furthermore, the floating point unit controller launches the basis answer into pipeline 5 directly behind (i.e., the clock cycle after) the rounding calculation in order to minimize the number of clock cycles necessary to compute the correct final answer. That is, the basis answer inputs into answer adjust circuitry 44 only one clock cycle behind the input of the rounding calculation result into rounding circuitry 10 for determination of correct final answer. Accordingly, rounding circuitry 10 reduces the number of clock cycles required to determine the round control signal RND_INC to a minimum of four clock cycles.

Pipeline 5 executes the rounding calculation instruction similarly to that described heretofore to produce a ROUND mantissa, exponent, and sign. Magnitude circuitry 66 (see FIG. 2) inputs the ROUND sign, exponent, and mantissa to determine whether the rounding calculation produced a result greater than, equal to, or less than zero. Magnitude circuitry 66 examines the ROUND mantissa and exponent. When the ROUND mantissa and exponent are 0, the rounding calculation result equals 0. Conversely, if the ROUND mantissa and exponent are not 0, magnitude circuitry examines the ROUND sign. When the ROUND sign is negative, the rounding calculation result is less than 0, otherwise, the rounding calculation result ins greater than 0.

GRX force 65 inputs the rounding mode and the output of magnitude circuitry 66 to determine the values for the forced guard bit FG, forced round bit FR, and forced sticky bit FX in accordance with the particular rounding mode and the IEEE 754-1985 rounding rules. After determining the values for the FG, FR, and FX, GRX force 65 outputs the FG, FR, and FX to a latch 64. At the beginning of the next clock cycle, latch 64 outputs the FG, FR, and FX to multiplexer 62. During this cycle, ITER_control_1 controls multiplexer 62 to output the FG, FR, and FX to round control 63. Round control 63 inputs the rounding mode and the FG, FR, and FX to determine whether the basis answer must be incremented. Round control 63 applies the IEEE 754-1985 rounding rules to the FG, FR, and FX to determine whether the multiplexer to selects the incremented basis answer or the unincremented basis answer.

Although this preferred embodiment utilizes algorithms that produce approximate answers less than or equal to the correct answer and then increments the approximate answer, if necessary, those skilled in the art will recognize that algorithms that produce approximate answers that are greater than or equal to the correct answer may be utilized. In that instance, the approximate answer would be decremented when necessary.

In view of the foregoing, those skilled in the art will recognize that, for any iterative operation, the correction factor is set and the particular temporary answer (i.e., the truncated answer or the incremented answer) utilized as the basis answer is determined predicated upon the rounding mode and where the approximate answer falls relative to an IEEE rounding boundary. Illustratively, for any iterative operation, when the rounding mode is round to nearest and the guard bit of the approximate answer could transition from 0 to 1, the correction factor is set to append a bit to the approximate answer and the truncated answer is utilized as the basis answer. Furthermore, when the rounding mode is round to nearest, round to zero, round to positive infinity for negative results, or round to negative infinity for positive results and the least significant bit of the approximate answer could transition, the correction factor is set to increment the approximate answer and the truncated answer is utilized as the basis answer. Additionally, when the rounding round to positive infinity for positive results or round to negative infinity for negative results and the least significant bit of the approximate answer could transition, the correction factor is set to increment the approximate answer and the incremented answer is utilized as the basis answer.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not limited in any respect by the foregoing description, rather, it is defined only by the claims that follow.

We claim:

1. An apparatus for rounding an approximate answer produced during the execution of an operation by a multiple stage execution pipeline, comprising:

first circuitry for determining if a rounding calculation is required wherein, when a rounding calculation is required, said second circuitry establishes a correction factor for the approximate answer and initiates the execution of the rounding calculation by the pipeline;

second circuitry for outputting calculated accuracy bits when no rounding calculation is required and for outputting forced accuracy bits when a rounding calculation is required;

third circuitry for determining the forced accuracy bits from the result of the rounding calculation; and fourth circuitry for establishing a rounding signal from the calculated accuracy bits when no rounding calculation is required and for establishing the rounding signal from the forced accuracy bits when the rounding calculation is required.

2. The apparatus according to claim 1 wherein said first circuitry inputs the calculated accuracy bits and a rounding mode to determine if a rounding calculation is required.

3. The apparatus according to claim 2 wherein said first circuitry determines the rounding calculation is required when the accuracy bits indicate the approximate answer is near a rounding boundary.

4. The apparatus according to claim 1 wherein, when the most significant bit of the accuracy bits may transition from a logical 0 to a logical 1, said first circuitry establishes the correction factor for the approximate answer by outputting a signal that facilitates the appending of a bit to the approximate answer.

5. The apparatus according to claim 1 wherein, when the least significant bit of the approximate answer may transition, said first circuitry establishes the correction factor for the approximate answer by outputting a signal that facilitates the incrementing of the approximate answer.

6. The apparatus according to claim 1 wherein said first circuitry initiates the execution of the rounding calculation by outputting a signal that facilitates the launching into the pipeline of a rounding calculation instruction, an at least one operand of the operation, and the approximate answer including the correction factor of the approximate answer.

7. A method of rounding an approximate answer produced during the execution of an operation by a multiple stage execution pipeline, comprising the steps of:

determining if a rounding calculation is required;

establishing a correction factor for the approximate answer when a rounding calculation is required;

initiating the execution of the rounding calculation by the pipeline;

determining forced accuracy bits from the result of the rounding calculation; and establishing a rounding signal from the forced accuracy bits when the rounding calculation is required.

8. The method according to claim 7 further comprising the step of establishing the rounding signal from calculated accuracy bits when no rounding calculation is required.

9. The method according to claim 8 wherein the step of determining if a rounding calculation is required includes the step of examining the calculated accuracy bits and a rounding mode to determine if the approximate answer is near a rounding boundary.

10. The method according to claim 8 wherein the step of establishing a correction factor includes the steps of:

examining the most significant bit of the accuracy bits to determine if that bit may transition from a logical 0 to a logical 1;

examining the least significant bit of the approximate answer to determine if that bit may transition;

appending a bit to the approximate answer when the most significant bit of the accuracy bits may transition from a logical 0 to a logical 1; and incrementing the approximate answer when the least significant bit of the approximate answer may transition.

11. The method according to claim 7 wherein the step of initiating the execution of the rounding calculation includes the step of launching into the pipeline a rounding calculation instruction, an at least one operand of the operation, and the approximate answer including the correction factor of the approximate answer.

* * * * *